United States Patent
Megat Abdul Aziz et al.

(10) Patent No.: US 12,310,440 B2
(45) Date of Patent: *May 27, 2025

(54) THIN ORGANIC SOLVENT RESISTANT GLOVE

(71) Applicant: Ansell Limited, Richmond (AU)

(72) Inventors: Putri Faridatul Akmar Binti Megat Abdul Aziz, Selangor (MY); Mei Yee Chin, Selangor (MY); Norazilayati Binti Rastam, Selangor (MY); Mohd Fairuz Bin Mohamad Zawawi, Selangor (MY); Hamidon Zain Bin Mohammed, Selangor (MY); Mohd Zabidi Bin Mohd Yasir, Selangor (MY); David Mark Lucas, Melaka (MY)

(73) Assignee: Ansell Limited, Richmond (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,935

(22) Filed: Mar. 20, 2024

(65) Prior Publication Data
US 2024/0225159 A1    Jul. 11, 2024

Related U.S. Application Data

(63) Continuation of application No. 16/767,242, filed as application No. PCT/AU2018/000258 on Dec. 13, 2018, now Pat. No. 11,944,143.

(60) Provisional application No. 62/598,010, filed on Dec. 13, 2017.

(51) Int. Cl.
| | | |
|---|---|---|
| *A41D 31/02* | (2019.01) | |
| *A41D 19/00* | (2006.01) | |
| *B29C 41/14* | (2006.01) | |
| *B29C 41/22* | (2006.01) | |
| *B29K 7/00* | (2006.01) | |
| *B29K 9/00* | (2006.01) | |
| *B29L 31/48* | (2006.01) | |
| *C08J 5/02* | (2006.01) | |
| *C08L 9/02* | (2006.01) | |
| *C08L 19/00* | (2006.01) | |

(52) U.S. Cl.
CPC ......... *A41D 31/02* (2013.01); *A41D 19/0058* (2013.01); *C08J 5/02* (2013.01); *C08L 9/02* (2013.01); *C08L 19/00* (2013.01); *A41D 2600/20* (2013.01); *B29C 41/14* (2013.01); *B29C 41/22* (2013.01); *B29K 2007/00* (2013.01); *B29K 2009/00* (2013.01); *B29K 2995/0058* (2013.01); *B29L 2031/4864* (2013.01); *C08J 2309/02* (2013.01); *C08J 2319/00* (2013.01); *C08J 2333/08* (2013.01); *C08J 2409/02* (2013.01); *C08J 2419/00* (2013.01); *C08J 2433/08* (2013.01); *C08L 2203/02* (2013.01)

(58) Field of Classification Search
None
See application file for complete search history.

(56) References Cited

U.S. PATENT DOCUMENTS

2017/0071271 A1\*  3/2017  Megat Abdul Aziz ..................... B29D 99/0067

\* cited by examiner

*Primary Examiner* — Robert T Butcher
(74) *Attorney, Agent, or Firm* — Moser Taboada

(57) ABSTRACT

A thin organic solvent resistant glove is disclosed including: a first polymeric layer in a shape of a glove including at least one of a blend of a polyisobutylene material and a nitrile-butadiene material, or a nitrile-butadiene material; a second polymeric layer in a shape of a glove including at least one of a polyisobutylene material or a blend of a polyisobutylene material and a nitrile-butadiene material, disposed on the first polymeric layer, and a third polymeric layer in a shape of a glove including a nitrile-butadiene material or an acrylic polymer material disposed on the second polymeric layer.

15 Claims, 5 Drawing Sheets

THIN ORGANIC SOLVENT RESISTANT GLOVE

CROSS-REFERENCE TO RELATED APPLICATIONS

This application is a continuation of co-pending U.S. patent application Ser. No. 16/767,242 filed May 27, 2020 which claims priority to International Application No. PCT/AU2018/000258 filed Dec. 13, 2018 which claims benefit to U.S. Provisional Patent Application No. 62/598,010 filed Dec. 13, 2017, all of which are incorporated herein by reference in their entireties.

BACKGROUND

Field

The present disclosure relates generally to gloves and more particularly to gloves having highly chemical resistant properties.

Description of the Related Art

Many workers wear gloves that provide protection from hazardous chemicals. For example, workers, and especially workers in industrial or laboratory settings, encounter many types of chemicals, e.g., aliphatic hydrocarbons, aromatic hydrocarbons, and/or polar and non-polar solvents. However, no single polymeric barrier can protect provide chemical resistance for all such chemicals. Furthermore, industrial gloves providing protection against ketones are especially thick, inflexible, and expensive, which is inadequate for laboratory work. Moreover, workers also want thin, flexible, comfortable gloves for extended use so hands do not tire easily and/or to perform delicate tasks requiring dexterity. The flexibility of a glove is highly correlated with the thickness of the glove and increases according to the inverse of the cube of the thickness.

With the foregoing in view, the inventors herein provide polymeric gloves that are thin, and highly chemically resistant to organic solvents and methods for manufacturing the composite gloves.

SUMMARY

A polymeric glove that is thin and resistant to organic solvents, substantially as shown in and/or described in connection with at least one of the figures, as set forth more completely in the claims, are disclosed. Various advantages, aspects, and novel features of the present disclosure will be more fully understood from the following description and drawings.

The foregoing summary is not intended, and should not be contemplated, to describe each embodiment or every implementation of the present disclosure. The Detailed Description and exemplary embodiments therein more particularly exemplify the present disclosure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only illustrative embodiments of this disclosure and are therefore not to be considered limiting of its scope, for the disclosure may admit to other equally effective embodiments.

From the disclosure and the following more detailed description of various embodiments it will be apparent to those skilled in the art that the present invention provides a significant advance in the technology of making polymer articles. Those skilled in the art, i.e., those having knowledge or experience in this area of technology, will recognize that many uses and design variations are possible for the making of polymer articles disclosed here. The following detailed discussion of various alternate features and embodiments will illustrate the general principles of the invention with reference to making polymer articles. Particularly significant are methods, and polymer articles made pursuant thereto, for providing polymer articles at lower costs and greater quality. Additional features and advantages of various embodiments will be better understood in view of the detailed description provided below.

Figure 1:
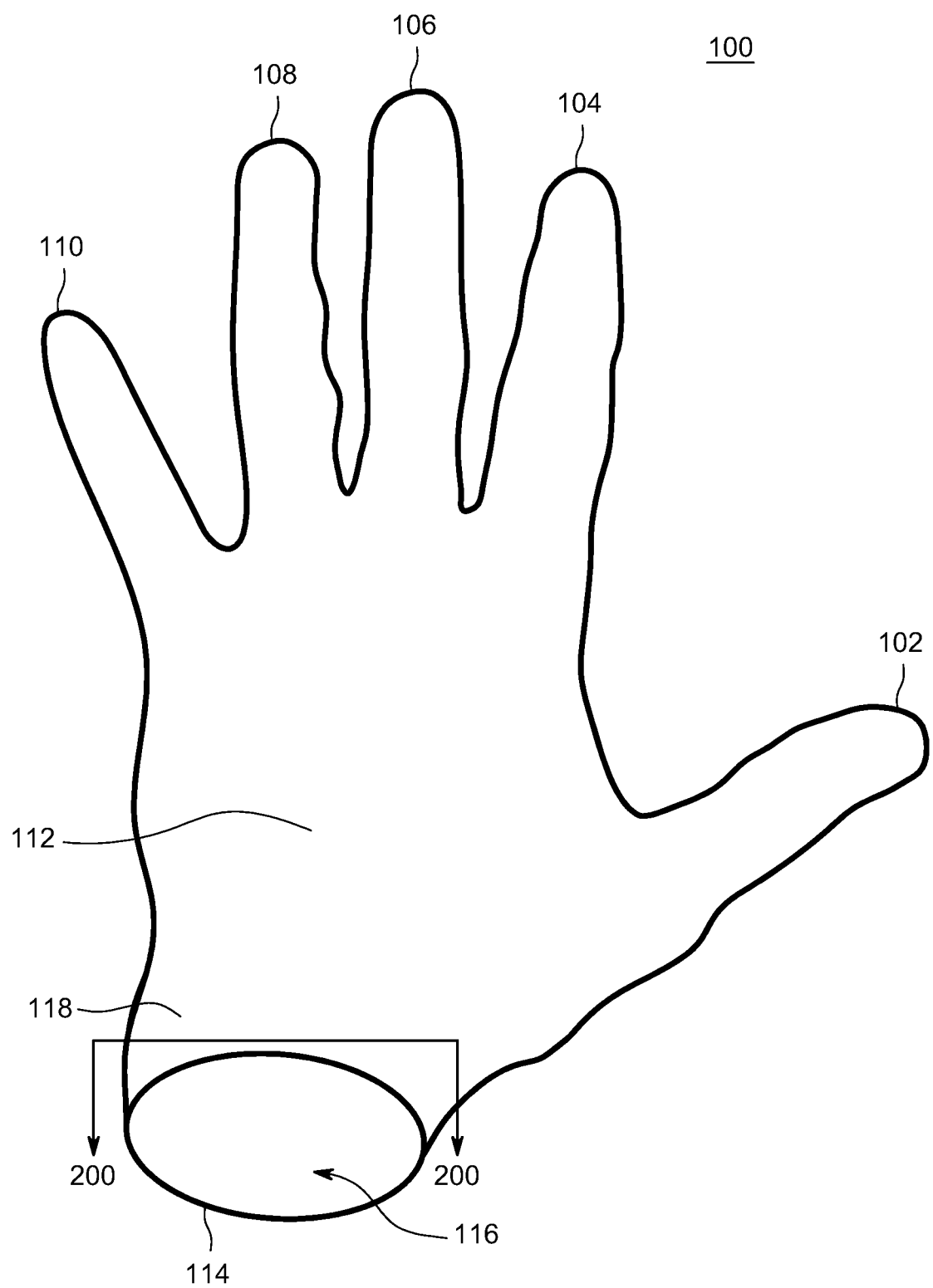
FIG. 1 depicts the palm side of a thin organic solvent resistant, layered polymeric glove, according to embodiments of the disclosure.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

Before describing embodiments of the present disclosure in detail, the terminology used herein is for the purpose of describing particular embodiments only, and is not intended to be limiting. Embodiments should not necessarily be limited to specific compositions, materials, sizes, designs or equipment, as such may vary within the scope of the disclosure. All technical and scientific terms used herein have the usual meaning conventionally understood by persons skilled in the art to which this disclosure pertains, unless context defines otherwise.

Embodiments according to the disclosure comprise polymeric gloves, for example, a thin organic solvent resistant polymeric glove. In embodiments, a thin organic solvent resistant polymeric glove comprises a first polymeric layer and a second polymeric layer integrally formed therewith. At least one embodiment includes a thin organic solvent resistant polymeric glove comprising a first polymeric layer and a second polymeric layer integrally formed therewith and a third polymeric layer integrally formed on the second polymeric layer. At least one embodiment according to the disclosure comprises a polymeric glove having an external nitrile-butadiene layer or external blended polyisobutylene and nitrile-butadiene layer integrally formed with an internal (skin-contacting) polymeric layer comprising polyisobutylene, nitrile-butadiene, or a blend of polyisobutylene and nitrile butadiene. At least one embodiment according to the disclosure comprises a polymeric glove having an external nitrile-butadiene layer, or external blended polyisobutylene and nitrile-butadiene layer integrally formed with a blend of a polyisobutylene and nitrile-butadiene polymers to form a middle layer and a nitrile-butadiene polymer to form an internal layer. At least one embodiment according to the disclosure comprises a polymeric glove having an external nitrile-butadiene layer, or external blended polyisobutylene and nitrile-butadiene layer integrally formed with a blend of a polyisobutylene and nitrile-butadiene polymers to form a middle layer and a nitrile-butadiene polymer or acrylic polymer to form an internal layer. At least one embodiment according to the disclosure comprises a thin organic solvent resistant polymeric glove having a relatively thick external nitrile-butadiene layer, or relatively thick external blended polyisobutylene and a nitrile-butadiene layer integrally formed on a middle layer comprising a blend of a polyisobutylene and a nitrile-butadiene polymer and a relatively thin internal layer comprising a nitrile-butadiene polymer or acrylic polymer. At least one embodiment according to the disclosure comprises a polymeric glove having a textured external nitrile-butadiene layer, or textured external blended layer of polyisobutylene and a nitrile-butadiene integrally formed with a blend of a polyisobutylene and nitrile-butadiene polymers to form a thin middle layer and a nitrile-butadiene polymer to form an internal layer. Other embodiments are discussed below including an external layer selected from one or more of nitrile-butadiene, a blend of nitrile-butadiene and polyisobutylene, polychloroprene, a blend of polychloroprene and nitrile-butadiene, a blend of nitrile-butadiene, polychloroprene and polyisobutylene, wherein the external layer is integrally formed with an internal layer including one of a blend of polyisobutylene and nitrile-butadiene, or a blend of polyisobutylene and polychloroprene to form a thin middle layer, and a nitrile-butadiene or acrylic polymer to form an internal layer.

In embodiments, a nitrile-butadiene layer provides strength and chemical resistance to weak acids, such as acetic acid, hydrocarbons, such as heptanes, hexanes, as well as various chemicals such as acetonitrile, acrylamides, carbon tetrachloride, chloroform, and salts and solutions and blends thereof. Also, an external layer comprising a nitrile-butadiene layer or external blended layer of polyisobutylene and a nitrile-butadiene can be textured using salts, providing enhanced grip and durability properties. Furthermore, in embodiments, a nitrile-butadiene layer or acrylic polymer provides softness and lubricity for ease of donning and doffing.

In embodiments, the polyisobutylene layer and/or polyisobutylene-nitrile butadiene blend layer, disposed as a middle layer, provides chemical resistance to organic solvents and particularly ketones, e.g., acetone, and other chemicals containing carbonyl moieties, such as aldehydes. The polyisobutylene layer and/or polyisobutylene-nitrile butadiene blend layer also protects against aromatic solvents, such as toluene and xylenes. The polyisobutylene layer and/or polyisobutylene-nitrile butadiene blend layers, disposed as a middle layer, provides chemical resistance to organic solvents, irrespective of state, i.e., gaseous or liquid state. In embodiments, the middle polymeric layer in a shape of a glove comprises a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr).

In embodiments, a blend of polyisobutylene and polychloroprene, disposed as a middle layer provides chemical resistance to organic solvents, irrespective of state, i.e., gaseous or liquid state.

In embodiments, a polyisobutylene and nitrile butadiene blend layer, disposed as an external layer, provides chemical resistance to organic solvents and particularly ketones, e.g., acetone, and other chemicals containing carbonyl moieties, such as aldehydes. The polyisobutylene-nitrile butadiene blend layer also protects against aromatic solvents, such as toluene and xylenes. The polyisobutylene-nitrile butadiene blend layer, disposed as an external layer, provides chemical resistance to organic solvents, irrespective of state, i.e., gaseous or liquid state.

In some embodiments, one of nitrile-butadiene, a blend of nitrile-butadiene and polyisobutylene, polychloroprene, a blend of polychloroprene and nitrile-butadiene, or a blend of polychloroprene, nitrile-butadiene, and polyisobutylene, disposed as an external layer, provides chemical resistance to organic solvents, irrespective of state, i.e., gaseous or liquid state.

Embodiments according to the disclosure further comprise a thin coating disposed as an internal layer, e.g., a nitrile-butadiene layer or acrylic layer. In some embodiments, the internal layer is, e.g., an acrylic polymer layer. The thin coating comprises, for example, a nitrile-butadiene composition, a natural rubber latex composition, a synthetic polyisoprene composition, and/or an acrylic composition. Any of the internal layers may be comprised of a composition having a total solids content (TSC) of approximately 18-20%. Some embodiments of the disclosure comprise an acrylic composition having a TSC of approximately 2-5%. The thin coating may comprise, for example, a nitrile-butadiene composition, having a total solids content of approximately 33%. The thin coating is applied generally by a dipping process as is known to those in the art. In at least one exemplary embodiment of the disclosure, a thin organic solvent resistant glove comprises a thin nitrile-butadiene coating approximately 0.001-0.002" thick (0.025 mm-0.05 mm), disposed as a skin-contacting layer integrally formed with a middle layer.

FIG. 1 depicts the palm side of a thin, layered polymeric glove 100, according to embodiments of the disclosure. The thin, layered polymeric glove comprises a thumb 102, an index finger 104, a middle finger 106, a ring finger 108, a little finger 110, a palm area 112, a cuff 118 and, optionally, a beaded ring 114 on the cuff 118. An opening 116 is capable of receiving a hand for donning and doffing the composite glove 100. In some embodiments according to the disclosure, grip features can be disposed into an external layer such as the nitrile layer, as discussed further herein.

Figure 2:
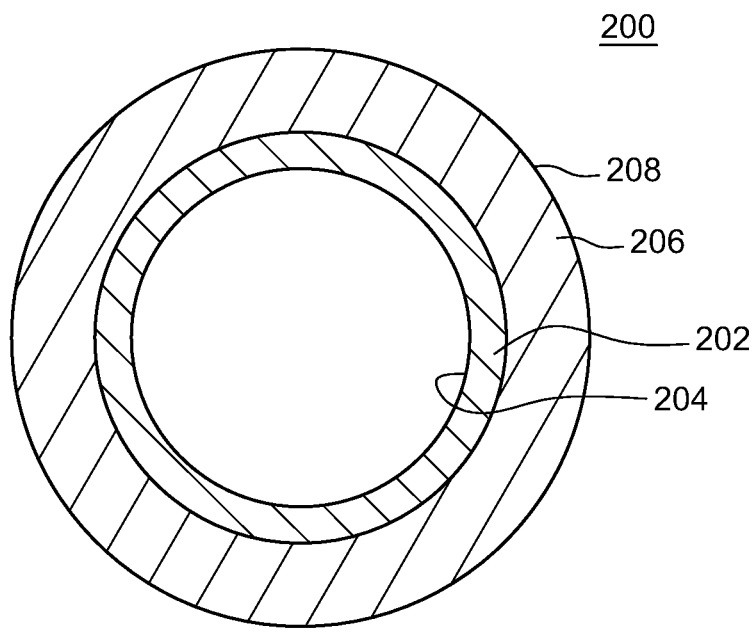
FIG. 2 depicts a cross section of the thin organic solvent resistant, layered polymeric glove of FIG. 1 according to embodiments of the disclosure.

FIG. 2 depicts a cross section 200 of the thin, layered polymeric glove 100 of FIG. 1, according to embodiments of the disclosure. The cross section 200 comprises a first polymeric layer 202, which comprises, for example, a polyisobutylene polymeric material or a blend of a polyisobutylene material and a nitrile-butadiene material and/or an acrylic polymer material. In embodiments, the first polymeric layer 202 is an internal, e.g., skin-contacting layer comprising a nitrile-butadiene or acrylic polymer. In some embodiments, glove 100 is characterized as a two layer chemical resistant glove.

The first polymeric layer 202 further comprises an interior surface 204, which is a skin-contacting surface, i.e., a donning side. The cross section 200 also shows a second polymeric layer 206 having an exterior surface 208, in intimate contact with the first polymeric layer 202. The second polymeric layer is, for example, a nitrile-butadiene material and is, optionally, a highly carboxylated nitrile-butadiene in embodiments according to the disclosure. Highly carboxylated, in this context, indicates approximately 30-40% carboxylation or greater. In some embodiments, the second polymeric layer 206 is one of a blend of nitrile-butadiene and polyisobutylene, or a blend of polychloroprene and polyisobutylene, disposed upon first polymeric layer 202, to provide chemical resistance to organic solvents, irrespective of state, i.e., gaseous or liquid state. In embodiments, a blend of polychloroprene and polyisobutylene includes polyisobutylene in an amount of 60-95 parts per hundred rubber (phr) and polychloroprene in an amount of 5 to 40 parts per hundred rubber (phr).

In embodiments, the first polymeric layer 202 and the second polymeric layer 206 are integrally formed, meaning that once formed together, the first polymeric layer 202 and the second polymeric layer 206 cannot be separated without destroying the composite glove 100, and have little or no gap there between. Embodiments of the disclosure comprise wherein the first polymeric layer 202 is thinner than the second polymeric layer 206. For example, at least one exemplary embodiment comprises a first polymeric layer 202 having a thickness of approximately 0.002" to 0.003" (0.05 mm-0.075 mm) and a second polymeric layer 206 having a thickness of approximately 0.007" to 0.010" (0.18 mm-0.25 mm).

Figure 3:
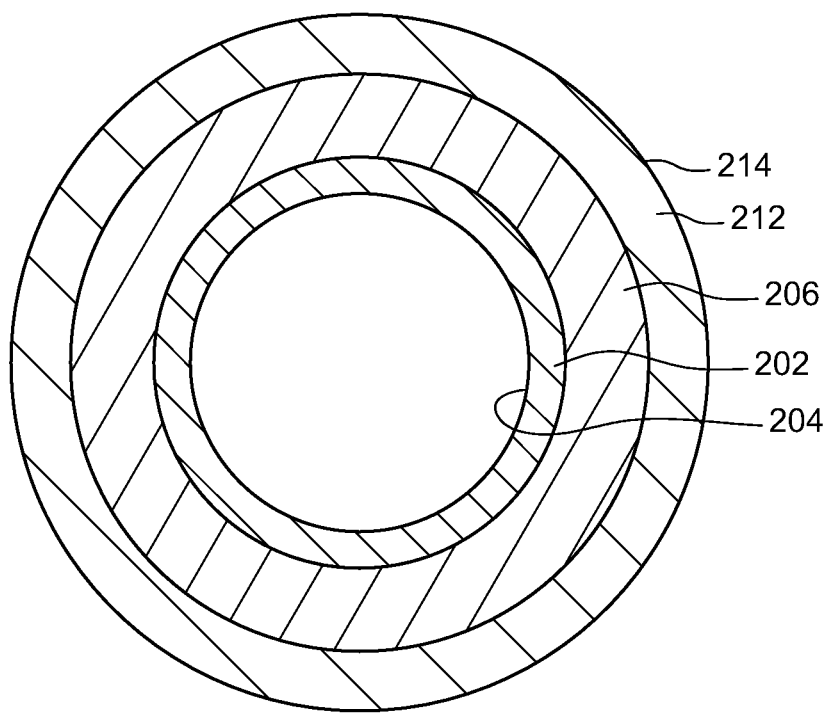
FIG. 3 depicts an alternative cross section of the thin organic solvent resistant, layered polymeric glove of FIG. 1 according to embodiments of the disclosure.

FIG. 3 depicts an alternative cross section 300 of the thin, layered polymeric glove 100 of FIG. 1 according to embodiments of the disclosure. The alternative cross section 300 depicts a third polymeric layer 212, having an exterior surface 214, disposed as an exterior layer on the second polymeric layer 206, which is therefore a middle layer, of the cross section 200, as discussed above. Embodiments according to the disclosure comprise wherein the third polymeric layer 212 comprises, for example, a nitrile-butadiene material, a polychloroprene material, a butyl rubber material, a natural rubber latex (NRL), a synthetic polyisoprene material, and/or an acrylic polymer material. In at least one embodiment, the third polymeric layer 212 comprises a blend of a polyisobutylene material and a nitrile-butadiene material, wherein the nitrile-butadiene is present in an amount of about 80 to 95 weight percent. In at least one embodiment, the third polymeric layer 212 comprises a blend of a polyisobutylene material and a nitrile-butadiene material, wherein the nitrile-butadiene is present in an amount of about 80 to 95 parts per hundred rubber (phr), and polyisobutylene material in an amount of about 20 to 5 parts per hundred rubber (phr). In embodiments, the third polymeric layer 212 comprises a blend of a polyisobutylene material and a nitrile-butadiene material, wherein the polyisobutylene material is present in an amount of about 5 to 20 weight percent. In embodiments, the third polymeric layer 212 comprises a blend of a polyisobutylene material and a nitrile-butadiene material, wherein the polyisobutylene material is present in an amount of about 5 to 20 parts per hundred rubber (phr) and the nitrile-butadiene material is present in 80 to 95 parts per hundred rubber (phr). In embodiments, the third polymeric layer 212 comprises a blend of a polyisobutylene material and a nitrile-butadiene material, wherein the polyisobutylene material is present in an amount of about 10 parts per hundred rubber (phr) of the third polymeric layer 212 and nitrile-butadiene material is present in an amount of about 90 parts per hundred rubber (phr) of the third polymeric layer 212.

In at least one embodiment, the third polymeric layer 212 comprises one of nitrile-butadiene, a blend of nitrile-butadiene and polyisobutylene, polychloroprene, a blend of polychloroprene and nitrile-butadiene, or a blend of polychloroprene, nitrile-butadiene, and polyisobutylene, disposed as an external layer, to provide chemical resistance to organic solvents, irrespective of state, i.e., gaseous or liquid state. In embodiments, a blend of polychloroprene, nitrile-butadiene, and polyisobutylene comprises or consists of: polychloroprene in an amount of 30 to 50 parts per hundred rubber (phr); nitrile-butadiene in an amount of 40 to 60 parts per hundred rubber (phr); and polyisobutylene in an amount of 10 to 30 parts per hundred rubber (phr). In embodiments, a blend of polychloroprene and nitrile butadiene comprises or consists of: polychloroprene in an amount of 20 to 60 parts per hundred rubber (phr), and nitrile butadiene in an amount of 40 to 80 parts per hundred rubber (phr).

In at least one embodiment according to the disclosure, the third polymeric layer 212 comprises a thickness ranging between 0.007' to 0.010", the second polymeric layer 206 comprises a thickness of 0.002" (0.05 mm) and the first polymeric layer 202 comprises a thickness of approximately 0.001" (0.025 mm). At least one exemplary embodiment of the disclosure provides a thin, layered polymeric glove in which the first polymeric layer 202 comprises a nitrile-butadiene material that is approximately 0.001" in thickness, a second polymeric layer 206 comprising, for example, a 75:25 to a 95:5 blend of polyisobutylene/nitrile-butadiene materials having a thickness of 0.002" (0.05 mm); and a third polymeric layer 212 comprising a nitrile-butadiene material and/or an acrylic polymer material having a thickness of 0.008" (0.20 mm).

Table 1 shows typical formulations for various compositions (Compositions A-J) used in the first polymeric layer 202, the second polymeric layer 206, and the third polymeric layer 212. Values are listed in parts per hundred by weight dry rubber (phr).

TABLE 1

| Components | (PHR) | | | | | | | | | |
|---|---|---|---|---|---|---|---|---|---|---|
| | A | B | C | D | E | F | G | H | I | J |
| Polyisobutylene | — | — | — | — | — | 75-95 | — | — | 10-30 | 60-95 |
| Polychloroprene | 100 | — | — | — | — | — | — | 20-60 | 30-50 | 5-40 |
| NBR | — | 100 | 100 | — | — | 5-25 | — | 40-80 | 40-60 | — |
| NRL | — | — | — | 100 | — | — | — | — | — | — |
| Synthetic PI | — | — | — | — | 100 | — | — | — | — | — |
| Acrylic | — | — | — | — | — | — | 100 | — | — | — |
| Fillers | — | — | — | 25-35 | — | — | — | — | — | — |
| TiO$_2$ | — | — | — | 5 | — | — | — | — | — | — |

TABLE 1-continued

| Components | (PHR) | | | | | | | | | |
|---|---|---|---|---|---|---|---|---|---|---|
| | A | B | C | D | E | F | G | H | I | J |
| Sulfur | 1.0 | 0.82 | 0.82 | 1.2 | 1.6 | 0.8-1.5 | — | — | — | — |
| Accelerator(s) | 1.5 | 1.5 | 1.5 | 1.0 | 0.9 | 0.0-1.5 | — | — | — | — |
| Activator (ZnO) | 5.0 | 1.6 | 1.6 | 1.0 | 0.7 | 1.0-2.0 | — | — | — | — |
| TSC (%) | 32 | 33-35 | 20 | 20 | 20 | 33-37 | 2-5 | — | — | — |

In some embodiments, the compositions of the present disclosure include a glove having a first polymeric layer 202, second polymeric layer 206, and a third polymeric layer 212. Suitable compositions for use in such layers include compositions as shown below in Table 2.

TABLE 2

| Polymeric layer 212 | Polymeric Layer 206 | Polymeric layer 202 |
|---|---|---|
| 1. Nitrile-butadiene; 2. Blend of nitrile-butadiene and polyisobutylene; 3. Polychloroprene; 4. Blend of polychloroprene and nitrile-butadiene; or 5. Blend of nitrile-butadiene, polychloroprene and polyisobutylene | 1. Blend of polyisobutylene and nitrile-butadiene; or 2. Blend of polyisobutylene and polychloroprene | 1. Nitrile-butadiene; or 2. Acrylic |

In embodiments, Table 1 shows typical formulations for various compositions (Compositions A-J) suitable for use in a first polymeric layer 202, second polymeric layer 206, and a third polymeric layer 212 a set forth in Table 2. Other embodiments include polymeric layer 212 comprising a blend of polychloroprene and nitrile-butadiene, polymeric layer 206 comprising a blend of polyisobutylene and polychloroprene, and polymeric layer 202 comprising a blend of nitrile-butadiene, polychloroprene and polyisobutylene. In one embodiment, a glove of the present disclosure includes polymeric layer 212 comprising or consisting of: a blend of nitrile-butadiene and polyisobutylene such as Composition F from Table 1; polymeric layer 206 comprising or consisting of: a blend of nitrile-butadiene and polyisobutylene such as Composition F from Table 1; and polymeric layer 202 comprising nitrile-butadiene comprising or consisting of Composition B of Table 1.

Figure 4:
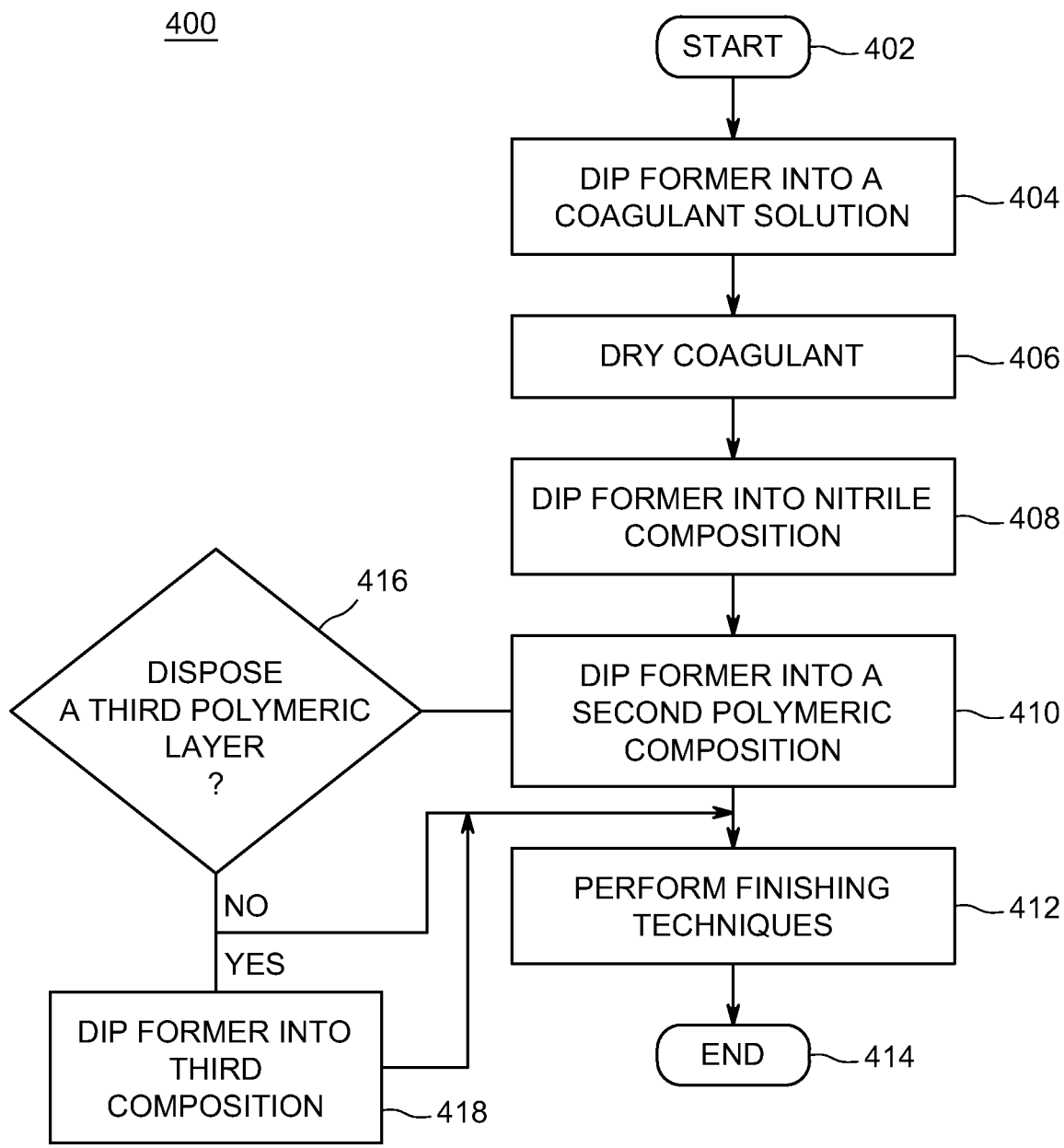
FIG. 4 depicts a flow diagram for methods of manufacturing thin organic solvent resistant, layered polymeric gloves according to embodiments of the disclosure.

FIG. 4 depicts a flow diagram 400 for methods of manufacturing thin, layered polymeric gloves according to embodiments of the disclosure. The method 400 starts at 402 and proceeds to 404, at which point a former has a coagulant solution applied thereto, such as by spraying or dipping into a coagulant solution. The coagulant solution may be a solution, for example, an aqueous or alcoholic solution comprising a concentration of 3-12% calcium citrate, calcium nitrate, calcium chloride, acetic acid, formic acid, and/or other salts and/or concentrations as are known to those in the art. At 406, the coagulant is allowed to dry as coagulant particles on the former.

At 408, the former having the coagulant applied thereto is dipped into a bath of a nitrile material composition, such as one or more of the formulations in Table 1, forming a nitrile layer thereon. For example, in embodiments, at 408, the former having the coagulant applied thereto is dipped into a bath including one or compositions B, C, F, H or I in Table 1. In embodiments, at 408, the former having the coagulant applied thereto is dipped into a bath of a blend of a polyisobutylene material and a nitrile-butadiene material, such as a composition comprising between about 85-95 phr nitrile-butadiene material and 5 to 20 phr polyisobutylene material. In embodiments, the blend of a polyisobutylene material and a nitrile-butadiene material comprises a blend of a polyisobutylene emulsion and a nitrile-butadiene emulsion. For example, embodiments of the blend comprise 10% polyisobutylene material and 90% nitrile-butadiene material by weight or by parts per hundred rubber. Another example comprises a blend having about 5 to 15% polyisobutylene material and 85 to 95% nitrile-butadiene material by weight or by parts per hundred rubber. At least one exemplary embodiment of the blend comprises approximately 10% polyisobutylene material and 90% nitrile-butadiene material by weight. Another example comprises a blend having about 5 to 15 nitrile-butadiene material and 85 to 95 polyisobutylene material by % weight or by parts per hundred rubber. Any of the embodiments of the blend of a polyisobutylene material and a nitrile-butadiene material further comprise aqueous blends. Also, the emulsions of the blend of a polyisobutylene material and a nitrile-butadiene material comprise aqueous, anionic emulsions. Any of the embodiments of the blend of a polyisobutylene material and a nitrile-butadiene material further comprise polyisobutylene materials or emulsions available from known suppliers. In embodiments polyisobutylene materials suitable for use herein require no organic solvents. Also, in embodiments, aqueous emulsions and coatings made therefrom are more chemically resistant to organic solvents.

Embodiments of the blend of a polyisobutylene material and a nitrile-butadiene material may be compounded as follows. A nitrile-butadiene composition is blended with a polyisobutylene composition. A nitrile-butadiene resin is delivered to a reactor. An aqueous mixture of a stabilizer as is known to those in the art, is added, along with curative agent(s), e.g., sulfur or sulfur donors. Flow and/or rheology modifiers, accelerator(s), and/or activators, such as zinc oxide, may be added to the nitrile-butadiene composition. Water is added to form a nitrile-butadiene composition having approximately 30-40% such as 33% total solids content (TSC). Optionally, aliphatic carboxylic acids are added to the composition. In some embodiments, the nitrile-butadiene resin is carboxylated. In some embodiments, the nitrile-butadiene is highly carboxylated, e.g., 35% or greater carboxylation. The nitrile-butadiene composition is then allowed to mature into an emulsion. In some embodiments, the nitrile-butadiene composition is stirred and allowed to mature for up to 24 hours to form the emulsion.

A polyisobutylene resin, such as an aqueous polyisobutylene, as discussed above, is delivered to a reactor. An aqueous mixture of a stabilizer as is known to those in the art, is added, along with curative agent(s), e.g., sulfur or sulfur donors. An activator(s), such as zinc oxide, may be added to the aqueous mixture. An accelerator, and/or flow and/or rheology modifier(s), is/are also added. For example, suitable accelerators are thiurams, sulphenamides, dithiocarbamates, thiazoles, and/or thioureas. In some embodiments, the accelerator comprises at least one of zinc dibutyl dithiocarbamate (ZDBC), zinc 2-mercaptobenzothiazole (ZMBT), N—N'-diphenylthiourea (DPTU), zinc diethyl dithiocarbamate (ZDEC), or sodium dibutyl dithiocarbamate (SDBC). Water is added to form a polyisobutylene composition having approximately 50% total solids content (TSC). Optionally, aliphatic carboxylic acids are added to the composition. The polyisobutylene composition is then allowed to mature into an emulsion. In some embodiments, the polyisobutylene composition is stirred and allowed to mature for up to 24 hours to form the polyisobutylene emulsion. After approximately 24 hours of maturation for both the nitrile-butadiene emulsion and the polyisobutylene emulsion, the nitrile-butadiene emulsion and the polyisobutylene emulsion are blended with each other to form a nitrile-butadiene/polyisobutylene blend. The nitrile-butadiene/polyisobutylene blend is then stirred and allowed to mature for approximately 30-40 hours. In at least one embodiment, the nitrile-butadiene/polyisobutylene blend comprises 90% by weight nitrile-butadiene and 10% by weight polyisobutylene. In at least one embodiment, the nitrile-butadiene/polyisobutylene blend comprises 90 phr nitrile-butadiene and 10 phr polyisobutylene. The overall TSC of the nitrile-butadiene/polyisobutylene blend is approximately 20-50%, according to some embodiments disclosed.

At 410, the former is dipped into, for example, a tank containing a second polymeric composition such as the formulation of Comp. F, disposing a coating or layer of a blend of polyisobutylene and nitrile-butadiene polymeric emulsions on the nitrile layer or on the blended layer of nitrile-butadiene and polyisobutylene as described herein, or external layer compositions described herein. The method 400 can then proceed to 412 for finishing techniques. The finishing techniques 412 comprise, for example, allowing the first layer, the second layer, and/or, an optional third layer to dry, leaching the first layer, the second layer, and/or the third layer with, for example, water, to remove proteins and impurities, beading the first layer, the second layer, and/or the third layer (as discussed below) to form a cuff, curing the first layer, the second layer, and/or the third layer at, for example, 110-140 degrees Celsius for 45 minutes in an oven to form the composite glove. In some embodiments, the second polymeric composition includes a blend of polyisobutylene and nitrile-butadiene; or a blend of polyisobutylene and polychloroprene as described above.

Alternatively, the method 400, following 410, may proceed to 416, where a decision is made to dispose a third polymeric layer to form a thin, layered polymeric having a three layer polymeric glove. If the answer is no, the method 400 proceeds to 412 as discussed above. If the answer is yes, the method 400 proceeds to 418, where the former is dipped into a tank having a third composition such as a natural rubber latex composition, a synthetic polyisoprene composition, a polychloroprene composition, a butyl composition, a nitrile-butadiene composition, or a blend composition thereof and subsequently proceeds to 412 for finishing techniques. In some embodiments, the method 400 proceeds to 418, where the former is dipped into a tank having a nitrile butadiene composition or an acrylic composition such as those shown in Table 1. Embodiments according to the disclosure may further comprise chlorinating the glove or adding a coating, such as a polyurethane, polyacrylic, or polyacrylonitrile-butadiene coating on an exterior surface of the glove during manufacturing. It is to be understood that the disposition of a thin coating, e.g., a polyurethane coating, a polyacrylic coating, or a thin nitrile coating, may be disposed on the thin, layered polymeric glove before the curing process at 412, which aids in stripping. Finally, the thin, layered polymeric glove may be stripped from the former, which inverts the thin, layered polymeric glove.

In embodiments, Composition F comprises a blend of a polyisobutylene emulsion and a nitrile-butadiene emulsion. For example, embodiments of the blend comprise 75% polyisobutylene material and 25% nitrile-butadiene material by weight (phr). Another example comprises a blend having 95% polyisobutylene material and 5% nitrile-butadiene material by weight (phr). At least one exemplary embodiment of the blend comprises approximately 90% polyisobutylene material and 10% nitrile-butadiene material by weight (phr). Any of the embodiments of composition F further comprise aqueous blends. Also, the emulsions of composition F comprise aqueous, anionic emulsions. In some embodiments, aqueous emulsions including polyisobutylene materials that require no organic solvents are suitable for any embodiment discussed herein. Also, aqueous emulsions and coatings made therefrom are more chemically resistant to organic solvents.

Embodiments of the composition F may be compounded as follows. A nitrile-butadiene composition is blended with a polyisobutylene composition. A nitrile-butadiene resin is delivered to a reactor. An aqueous mixture of a stabilizer as is known to those in the art, is added, along with curative agent(s), e.g., sulfur or sulfur donors. Flow and/or rheology modifiers, accelerator(s), and/or activators, such as zinc oxide, may be added to the nitrile-butadiene composition. Water is added to form a nitrile-butadiene composition having approximately 33% total solids content (TSC). Optionally, aliphatic carboxylic acids are added to the composition. In some embodiments, the nitrile-butadiene resin is carboxylated. In some embodiments, the nitrile-butadiene is highly carboxylated, e.g., 35% or greater carboxylation. The nitrile-butadiene composition is then allowed to mature into an emulsion. In some embodiments, the nitrile-butadiene composition is stirred and allowed to mature for up to 24 hours to form the emulsion.

A polyisobutylene resin, such as an aqueous polyisobutylene, as discussed above, is delivered to a reactor. An aqueous mixture of a stabilizer as is known to those in the art, is added, along with curative agent(s), e.g., sulfur or sulfur donors. An activator(s), such as zinc oxide, may be added to the aqueous mixture. An accelerator, and/or flow and/or rheology modifier(s), is/are also added. For example, suitable accelerators are thiurams, sulphenamides, dithiocarbamates, thiazoles, and/or thioureas. In some embodiments, the accelerator comprises at least one of zinc dibutyl dithiocarbamate (ZDBC), zinc 2-mercaptobenzothiazole (ZMBT), N—N'-diphenylthiourea (DPTU), zinc diethyl dithiocarbamate (ZDEC), or sodium dibutyl dithiocarbamate (SDBC). Water is added to form a polyisobutylene composition having approximately 50% total solids content (TSC). Optionally, aliphatic carboxylic acids are added to the composition. The polyisobutylene composition is then allowed to mature into an emulsion. In some embodiments, the polyisobutylene composition is stirred and allowed to mature for up to 24 hours to form the polyisobutylene emulsion. After approximately 24 hours of maturation for both the nitrile-butadiene emulsion and the polyisobutylene emulsion, the nitrile-butadiene emulsion and the polyisobutylene emulsion are blended with each other to form a nitrile-butadiene/polyisobutylene blend. The nitrile-butadiene/polyisobutylene blend is then stirred and allowed to mature for approximately 30-40 hours. In at least one embodiment, the nitrile-butadiene/polyisobutylene blend comprises 10% nitrile-butadiene and 90% polyisobutylene. In at least one embodiment, the nitrile-butadiene/polyisobutylene blend comprises 10 phr nitrile-butadiene and 90 phr polyisobutylene. The overall TSC of the nitrile-butadiene/polyisobutylene blend is approximately 33-47%, according to some embodiments disclosed.

Figure 5:
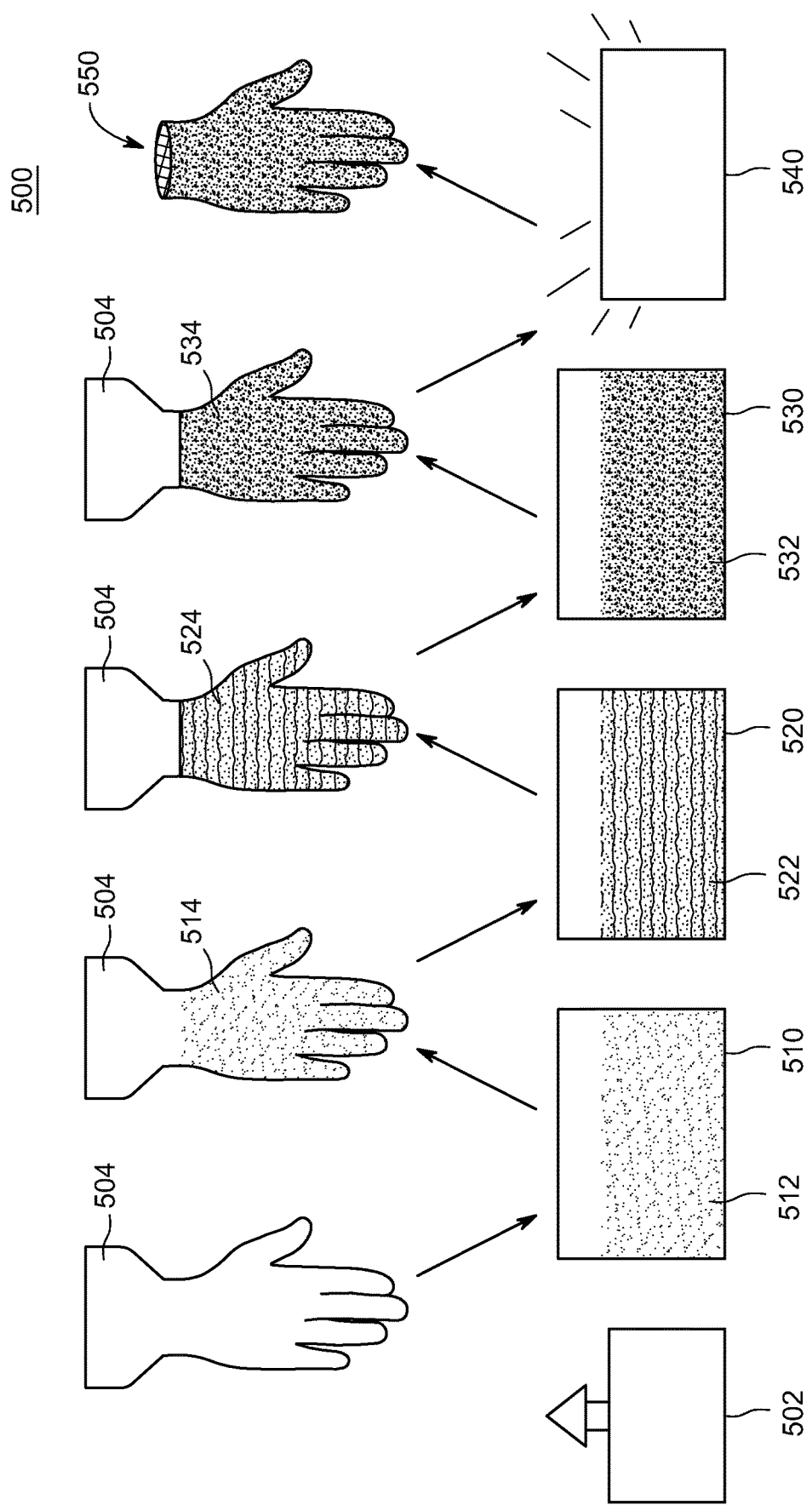
FIG. 5 depicts an apparatus used to manufacture the thin organic solvent resistant, layered polymeric gloves, according to embodiments of the disclosure.

FIG. 5 depicts an apparatus 500 used to manufacture the thin, layered polymeric glove, according to embodiments of the disclosure. The apparatus 500 comprises a controller 502, which controls, for example, production line equipment, such as electronic circuits for controlling robots that deliver glove formers 504 to tanks 510, 520, 530, and an oven 540. A former 504 is provided. Optionally, the former 504 is dipped into a coagulant. Also, the former 504 is optionally heated, for example, pre-heated to approximately 35-70° C., before dipping the former into a coagulant bath or otherwise applied. The former 504 is dipped into a tank 510 containing a first polymeric composition, such as a nitrile-butadiene composition or blended of nitrile-butadiene and polyisobutylene as described herein, which becomes disposed on the former 504 as a first polymeric layer 514. In some embodiments, the former 504 is dipped into a tank 510 containing a first polymeric composition, such as a nitrile-butadiene composition, a blend of nitrile-butadiene and polyisobutylene as described herein, polychloroprene, blend of polychloroprene and nitrile butadiene, or a blend of nitrile butadiene, polychloroprene, and polyisobutylene which becomes disposed on the former 504 as a first polymeric layer 514. The former 504 having the first polymeric layer 514 disposed thereon is removed from the tank 510 and allowed to dry and/or gel.

The former 504 having the first polymeric layer 514 disposed thereon is then dipped into a tank 520, containing a second polymeric composition 522, such as a blend of a polyisobutylene material and a nitrile butadiene material and is removed therefrom, disposing the second polymeric composition as a second polymeric layer 524. In some embodiments, a former 504 having the first polymeric layer 514 disposed thereon is then dipped into a tank 520, containing a second polymeric composition 522, such as a blend of a polyisobutylene material and a polychloroprene material and is removed therefrom, disposing the second polymeric composition as a second polymeric layer 524.

In embodiments, the former 504 is then delivered to a tank 530 containing a third polymeric composition 532, such as a nitrile-butadiene material, a polychloroprene material, and or the like, which is disposed as a third polymeric layer 534. More specifically, in some embodiments, former 504 is delivered to a tank 530 containing a third polymeric composition 532, such as a nitrile-butadiene material, a polychloroprene material, a blend of nitrile butadiene and polyisobutylene, blend of polychloroprene and nitrile butadiene, or blend of nitrile butadiene, polychloroprene and polyisobutylene which is disposed as a third polymeric layer 534. The former 504 is then delivered to an oven 540, wherein the first polymeric layer 514, the second polymeric layer 524, and the third polymeric layer 534 are cured with heat, as discussed above, to form a thin, layered polymeric glove. The curing can be accomplished in two or more stages of varied temperatures and/or time periods, as discussed above. A thin organic solvent resistant polymeric glove 550 is then stripped from the former 504, and is optionally inverted, i.e., turned inside out. Optionally, the former 504 is dipped into a water tank before the curing step to leach any impurities and/or proteins from the first polymeric layer 512 or third polymeric layer 534.

Figure 6:
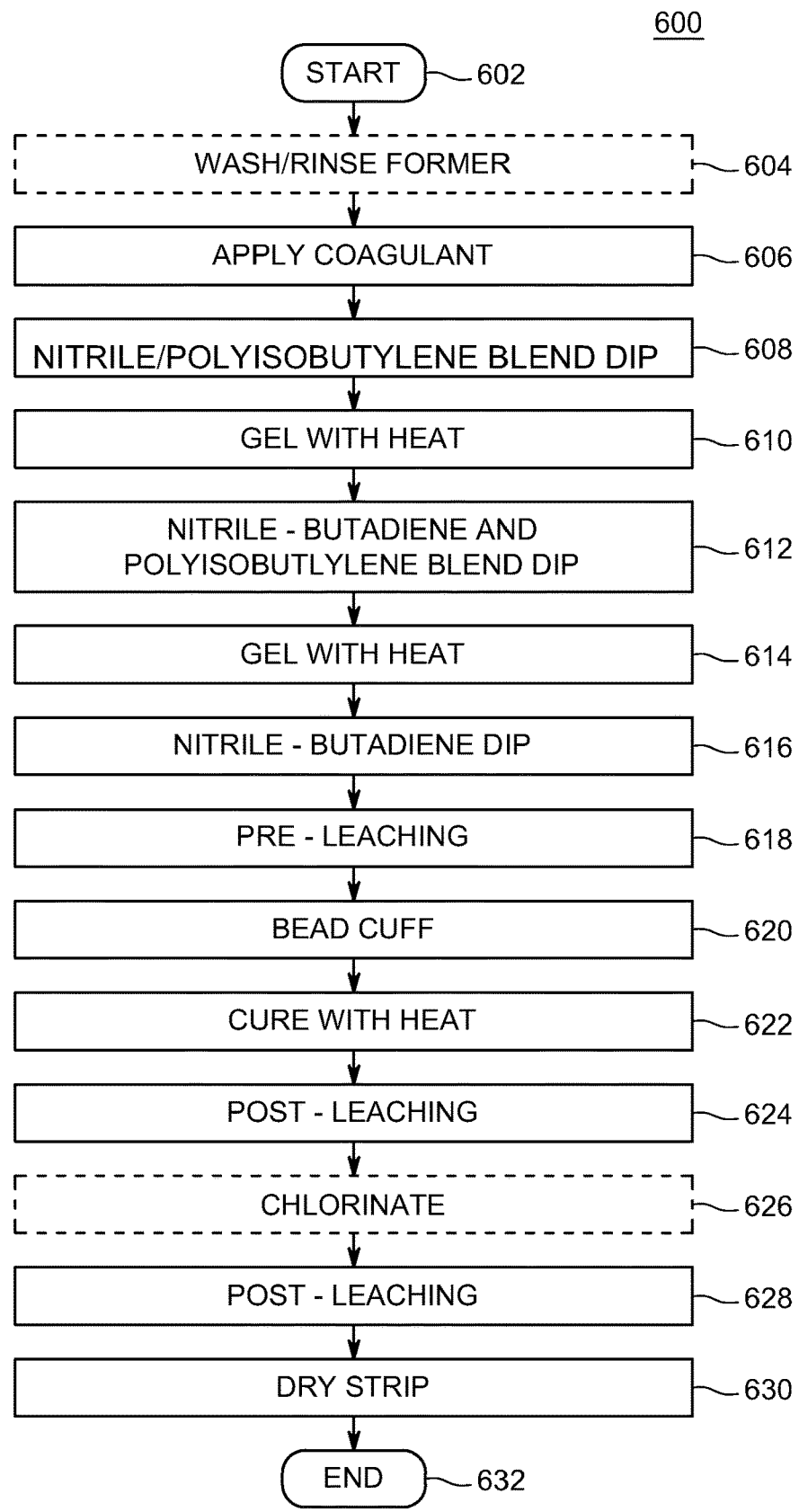
FIG. 6 depicts a flow diagram for a second method for manufacturing thin organic solvent resistant, layered polymeric gloves, according to embodiments of the disclosure.

FIG. 6 depicts a flow diagram 600 for a second method for manufacturing thin, layered polymeric gloves, according to embodiments of the disclosure. The method 600 starts at 602 and proceeds to 604, at which point a former is optionally washed and rinsed. Washing may be performed by a water bath and/or with the use of nylon brushes. In some embodiments, the former may be pre-heated to a temperature of approximately 36-38° C. At 606, a coagulant is applied on the former, such as by spraying or dipping into a coagulant solution, and allowed to dry as coagulant particles on the former. In some embodiments according to the disclosure, the coagulant solution comprises, for example, an aqueous solution of approximately 2-10% calcium nitrate or a weak coagulant, e.g., a 5% acetic acid solution.

At 608, the former having the coagulant applied thereto is dipped into a bath of a nitrile-butadiene composition or blended composition of nitrile-butadiene and polyisobutylene as described herein, forming a first nitrile-butadiene layer thereon or blended layer of nitrile-butadiene and polyisobutylene thereon. For example, a nitrile/polyisobutylene blend suitable for use herein. In at least one embodiment, the nitrile-butadiene composition is Composition B or Composition C, as described in Table 1. In another embodiment, the composition comprises about 90 phr nitrile-butadiene and about 10 phr polyisobutylene. At 610, the first nitrile-butadiene layer or blend of nitrile-butadiene and polyisobutylene on the former is then gelled within an oven. The oven heats the first nitrile-butadiene layer or blended layer of nitrile-butadiene and polyisobutylene at a temperature of 100-130 degrees Celsius for approximately 2 minutes.

At 612, the former is dipped into a blend of a nitrile-butadiene composition and a polyisobutylene composition, disposing a second nitrile-butadiene/polyisobutylene layer onto the first nitrile-butadiene layer. In at least one exemplary embodiment, the blend of a nitrile-butadiene composition and a polyisobutylene composition is Composition F, as described above. At 614, the former having the first nitrile-butadiene layer and the second nitrile-butadiene/polyisobutylene layer is delivered to an oven for gelling at a temperature of 100-130 degrees Celsius for approximately 2 minutes.

The method 600 then proceeds 616, where a third layer is added by dipping the former having the first nitrile-butadiene layer and the second nitrile-butadiene/polyisobutylene layer disposed thereon into another bath containing a polymeric composition. In at least one embodiment, the bath containing a polymeric composition comprises a nitrile-butadiene composition, as described above. In at least one embodiment, the bath containing a polymeric composition comprises an acrylic polymer material composition, as described above. Also, at least one exemplary embodiment of the nitrile-butadiene composition comprises Composition B or Composition G of Table 1.

The method 600 proceeds to 618 for pre-leaching, for example, or washing the former and nitrile, nitrile/polychloroprene and nitrile layers in hot water, to remove proteins and impurities therefrom. At 620, the first nitrile-butadiene layer, the second nitrile-butadiene/polyisobutylene layer, and the third nitrile-butadiene layer or acrylic polymer layer are beaded at a cuff.

At 622, the first nitrile-butadiene layer, the second nitrile-butadiene/polyisobutylene layer, and the third nitrile-butadiene layer or acrylic polymer layer are then cured at, for example, 110-150 degrees Celsius for 30 minutes in an oven. At 624, the first nitrile-butadiene layer or blended nitrile-butadiene/polyisobutylene layer, the second nitrile-butadiene/polyisobutylene layer, and the third nitrile-butadiene layer or acrylic polymer layer undergo a post-leaching operation. At 626, the thin, layered polymeric glove may be optionally chlorinated. At 628, the first nitrile-butadiene layer or blended nitrile-butadiene/polyisobutylene layer, the second nitrile-butadiene/polyisobutylene layer, and the third nitrile-butadiene layer or acrylic polymer layer optionally undergo a second post-leaching operation if, for example, the chlorinating was performed at 626. At 630, the first nitrile-butadiene layer or blended nitrile-butadiene/polyisobutylene layer, the second nitrile-butadiene/polyisobutylene layer, and the third nitrile-butadiene layer or acrylic polymer layer are dried, forming a glove, which is stripped from the former, which may optionally invert the glove. In embodiments, by inverting the glove, the first nitrile-butadiene layer or blended nitrile-butadiene/polyisobutylene layer of the glove becomes the external layer or outer layer when donned or placed on the hand of the wearer. The method 600 ends at 632. It is to be understood that if a salt-texturization process is used to texture, for example, the fingertips, it is typically performed before the pre-leaching step at 618, although it may be accomplished after the pre-leaching step 618. Without intending to be limited by theory, some embodiments comprise moisture on it is believed that moisture on the first nitrile-butadiene layer and/or the second nitrile-butadiene/polyisobutylene layer, acting as a primer to adhere the nitrile-butadiene layer(s).

In at least one embodiment according to the disclosure, the organic solvent resistant glove comprises a nitrile-butadiene layer that is approximately 0.001" to 0.003" (0.025-0.075 mm) in thickness. The nitrile-butadiene composition may be the same composition or a different nitrile-butadiene composition at 608 and 616. In some embodiments, the nitrile-butadiene composition at 616 has, optionally, a total solids content (TSC), for example, of 18-20% TSC, that is lower than the nitrile composition at 608, for example, generally 30-45% TSC, so that a thinner nitrile-butadiene coating may be disposed on the second polymeric layer.

Optionally, embodiments according to the disclosure further comprise texturization on surfaces of gloves. For example, methods and technologies described in U.S. Pat. Nos. 7,771,644 and 8,522,363, wherein salt is impregnated into a tacky layer of nitrile, which coagulates the nitrile molecules, and the salt is later dissolved with a solvent to leave multi-faceted cavities/indentations on and within a surface of the nitrile, the entire disclosures of which are commonly assigned and incorporated by reference in entirety. Also, embodiments according to the disclosure further comprise an external nitrile layer that is texturized using a textured former. In some embodiments, the textured former comprises, for example, a ceramic former having cavities disposed within a surface of the former. The cavities comprise a mean roughness depth of approximately 25-50 micrometers and may be as deep as 75 micrometers in depth. Moreover, the former may comprise peaks, which impart cavities onto a glove made therewith. In some embodiments, only the thumb and/or fingertips and/or palm areas are textured.

Optionally, methods according to embodiments of the disclosure include wherein the curing of the polymeric layers by heating the non-foamed polymeric, elastomeric, or latex coating and the foamed coating at a first temperature and a second curing step at a second temperature, wherein the second temperature is higher than the first temperature. Furthermore, optionally, methods include wherein curing processes include heating the first polymeric layer and the second layer in gradients, for example, 50-90° C. for 5-10 minutes and 90-135° C. for 20 to 90 minutes.

Optionally, in some embodiments, the process for forming a polymer layer such as those described above comprises contacting the polymer layers with a primer solution comprising or consisting of a low concentration of calcium nitrate before each latex dip to increase the pick-up of the latex. In embodiments, the inclusion of primer in an article, such as a glove, dipping process, and the sequence of dipping improves and evens out film formation contributing to improved chemical permeation.

Embodiments according to the disclosure include highly chemical resistant thin, layered polymeric gloves. A highly chemical resistant thin, layered polymeric glove may comprise a polychloroprene layer disposed on a nitrile-butadiene layer, or a layer of natural rubber latex or synthetic polyisoprene layer on a layer of polychloroprene and a layer of nitrile-butadiene, either or which may have a polyisobutylene material, or blend of polyisobutylene material and nitrile-butadiene material disposed thereon. Any of the organic solvent resistant thin, layered polymeric gloves comprising a polyisobutylene material and/or polyisobutylene material and nitrile-butadiene materials may have a thin layer of a polyacrylic material, a natural rubber composition, a synthetic polyisoprene material, or a polyurethane material disposed thereon. Also, any of the highly chemical resistant thin, layered polymeric gloves may comprise a thin layer of a nitrile-butadiene material disposed on the inner layer or the outer layer.

In embodiments, the first and second polymeric layer may show resistance to acetone. Resistance to acetone by be measured in accordance with EN374 the European Standard Protective Gloves against Chemicals and Micro-organisms. Testing may be performed as described in the standard at room temperature of 25 degrees Celsius. In embodiments, the first polymeric layer second polymeric layer and third polymeric layer may show excellent chemical resistance to acetone, methyl ethyl ketone, and methyl isobutyl ketone when tested in accordance with EN374-3 chemical permeation test.

In embodiments, the present disclosure relates to a thin organic solvent resistant glove, comprising: a first polymeric layer in a shape of a glove comprising a blend of a polyisobutylene material and a nitrile-butadiene material; a second polymeric layer comprising a blend of a polyisobutylene material and a nitrile-butadiene material, disposed on the first polymeric layer; and a third polymeric layer comprising a nitrile-butadiene material disposed on the second polymeric layer. In embodiments, first polymeric layer has a thickness of 0.20 mm or about 0.20 mm, the second polymeric layer has a thickness of approximately 0.05 mm, and the third polymeric layer having a thickness of about 0.025 mm or 0.025 mm. In some embodiments, the thin organic solvent resistant glove has a total thickness of approximately 0.275 mm. In some embodiments, the third polymeric layer comprises or consists of a composition having approximately 18-20% total solids content. In some embodiments, the first polymeric layer comprises or consists of a composition having approximately 33% total solids content. In some embodiments, at least one of the first polymeric layer or the third polymeric layer comprises a textured surface having multi-faceted cavities. In embodiments, the first polymeric layer or the third polymeric layer is disposed as an external layer. In some embodiments, the thin organic solvent resistant glove is cured. In some embodiments, the blend of a polyisobutylene material and a nitrile-butadiene material of the first polymeric layer comprises about 80 to 95 phr nitrile-butadiene material, and comprises about 5 to 20 parts per hundred rubber (phr) polyisobutylene material. In embodiments, the blend of a polyisobutylene material and a nitrile-butadiene material of the first polymeric layer comprises about 90 parts per hundred rubber (phr) nitrile-butadiene material, and about 10 parts per hundred rubber (phr) polyisobutylene material.

In some embodiments, the present disclosure relates to a thin organic solvent resistant glove, comprising: a first polymeric layer in a shape of a glove comprising a blend of a polyisobutylene material and a nitrile-butadiene material; a second polymeric layer comprising at least one of a blend of a polyisobutylene material and a nitrile-butadiene material disposed on the first polymeric layer; and a third polymeric layer comprising a nitrile-butadiene material or an acrylic polymer material disposed on the second polymeric layer.

In embodiments, the present disclosure relates to a thin organic solvent resistant glove, comprising: a first polymeric layer in a shape of a glove comprising at least one of a blend of a polyisobutylene material and a nitrile-butadiene material, or a nitrile-butadiene material; a second polymeric layer comprising a blend of a polyisobutylene material and a nitrile-butadiene material, disposed on the first polymeric layer; and a third polymeric layer comprising a nitrile-butadiene material or an acrylic polymer material, disposed on the second polymeric layer.

In embodiments, the present disclosure relates to a an organic solvent resistant glove, comprising: a first cured polymeric layer in a shape of a glove comprising a blend of a polyisobutylene material and a nitrile-butadiene material; a second cured polymeric layer comprising at least one of a polyisobutylene material or a blend of a polyisobutylene material and a nitrile-butadiene material, disposed on the first cured polymeric layer; and a third cured polymeric layer comprising a nitrile-butadiene material or an acrylic polymer material, disposed on the second cured polymeric layer. In embodiments, the first cured polymeric layer is disposed as an external layer. In some embodiments, the second cured polymeric layer comprising a blend of a polyisobutylene material and a nitrile-butadiene material, disposed on the first cured polymeric layer. In some embodiments, the third cured polymeric layer comprises a nitrile-butadiene material disposed on the second cured polymeric layer. In some embodiments, the first cured polymeric layer is a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr). In some embodiments, the second cured polymeric layer is a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr).

In some embodiments, the present disclosure relates to a thin organic solvent resistant glove, comprising or consisting of: an inner polymeric layer comprising: 1) a nitrile-butadiene material, or 2) an acrylic polymer material. In embodiments the thin organic solvent resistant glove, comprises or consists of: a middle polymeric layer comprising at least one of: 1) a polyisobutylene material; 2) a blend of a polyisobutylene material and a nitrile-butadiene material; 3) or a blend of polyisobutylene material and polychloroprene material disposed on the inner polymeric layer. In embodiments the thin organic solvent resistant glove, comprises or consists of: an external polymeric layer in a shape of a glove comprising at least one of: 1) a blend of a polyisobutylene material and a nitrile-butadiene material; 2) a nitrile-butadiene material; 3) a polychloroprene material; 4) a blend of polychloroprene material and nitrile butadiene material; or 5) a blend of nitrile butadiene material, polychloroprene material and polyisobutylene material, disposed on the middle polymeric layer. In some embodiments, the external polymeric layer in a shape of a glove comprises a blend of a polyisobutylene material and a nitrile-butadiene material. In some embodiments, the middle polymeric layer in a shape of a glove comprises a blend of a polyisobutylene material and a nitrile-butadiene material, disposed on the inner polymeric layer.

In some embodiments, the present disclosure relates to a thin organic solvent resistant glove, comprising or consisting of: an inner polymeric layer comprising one of: 1) a nitrile-butadiene material; or 2) an acrylic polymer material. In some embodiments, the present disclosure relates to a thin organic solvent resistant glove, comprising or consisting of a middle polymeric layer comprising or consisting of one of: 1) a polyisobutylene material; 2) a blend of a polyisobutylene material and a nitrile-butadiene material; or 3) a blend of polyisobutylene material and polychloroprene material disposed on the inner polymeric layer. In some embodiments, the present disclosure relates to a thin organic solvent resistant glove, comprising or consisting of an external polymeric layer in a shape of a glove comprising one of: 1) a blend of a polyisobutylene material and a nitrile-butadiene material; 2) a nitrile-butadiene material; 3) a polychloroprene material; 4) a blend of polychloroprene material and nitrile butadiene material; or 5) a blend of nitrile butadiene material, polychloroprene material and polyisobutylene material, disposed on the middle polymeric layer. In embodiments, non-limiting examples of polychloroprene and blends of nitrile butadiene and polychloroprene materials suitable for use herein include the compositions shown in Table 1.

In some embodiments, the present disclosure relates to a thin organic solvent resistant glove, comprising, a first polymeric layer in a shape of a glove comprising at least one of a blend of a polyisobutylene material and a nitrile-butadiene material, or a nitrile-butadiene material; a second polymeric layer comprising at least one of a polyisobutylene material or a blend of a polyisobutylene material and a nitrile-butadiene material, disposed on the first polymeric layer; and a third polymeric layer comprising a nitrile-butadiene material or an acrylic polymer material, disposed on the second polymeric layer. In embodiments, the second polymeric layer is a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr). In embodiments, the first polymeric layer is a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr).

In embodiments, the present disclosure relates to a thin organic solvent resistant glove, including: a first polymeric layer in a shape of a glove comprising at least one of a blend of a polyisobutylene material and a nitrile-butadiene material, or a nitrile-butadiene material; a second polymeric layer in a shape of a glove comprising at least one of a polyisobutylene material or a blend of a polyisobutylene material and a nitrile-butadiene material, disposed on the first polymeric layer; and a third polymeric layer in a shape of a glove comprising a nitrile-butadiene material or an acrylic polymer material, disposed on the second polymeric layer.

In embodiments, the present disclosure relates to an organic solvent resistant glove, comprising: a first cured polymeric layer in a shape of a glove comprising a blend of a polyisobutylene material and a nitrile-butadiene material; a second cured polymeric layer in a shape of a glove comprising at least one of a polyisobutylene material or a blend of a polyisobutylene material and a nitrile-butadiene material, disposed on the first cured polymeric layer; and a third cured polymeric layer in a shape of a glove comprising a nitrile-butadiene material or an acrylic polymer material, disposed on the second cured polymeric layer.

In embodiments, the present disclosure relates to an organic solvent resistant glove, comprising: an inner polymeric layer in a shape of a glove comprising a nitrile-butadiene material or an acrylic polymer material; a middle polymeric layer in a shape of a glove comprising at least one of a polyisobutylene material, a blend of a polyisobutylene material and a nitrile-butadiene material, or a blend of polyisobutylene material and polychloroprene material disposed on the inner polymeric layer; and an external polymeric layer in a shape of a glove comprising at least one of a blend of a polyisobutylene material and a nitrile-butadiene material, a nitrile-butadiene material, a polychloroprene material, a blend of polychloroprene material and nitrile butadiene material, or a blend of nitrile butadiene material, polychloroprene material and polyisobutylene material disposed on the middle polymeric layer.

The present disclosure also relates to a method for forming a an organic solvent resistant glove, including: coating a hand shaped former with a coagulant; disposing a first layer of a polymeric material on the former, wherein in the first layer comprises one of nitrile-butadiene, a blend of nitrile-butadiene and polyisobutylene, polychloroprene, a blend of polychloroprene and nitrile-butadiene, or a blend of nitrile-butadiene, polychloroprene and polyisobutylene material. Non-limiting example of such materials suitable for use herein are shown in Table 1. In embodiments, a method for forming a an organic solvent resistant glove, includes disposing a second layer of a polymeric material onto the first layer, wherein the second polymeric layer comprises a blend of polyisobutylene and nitrile-butadiene, or blend of polyisobutylene and polychloroprene. Non-limiting examples of such materials suitable for use here are shown in Table 1. In embodiments, a method for forming an organic solvent resistant glove, includes, optionally, disposing a third layer of a polymeric material onto the second layer, wherein the third layer comprises a nitrile-butadiene, or acrylic material. Non-limiting examples of such materials suitable for use herein are shown in Table 1. In embodiments, a method for forming an organic solvent resistant glove, includes, curing the first layer of a polymeric material, the second layer of a polymeric material, and the third layer of polymeric material. In embodiments, the glove may be inverted when removed from the former, such that the first layer is the external layer of the glove (furthest from the skin of a user).

In embodiments, the terms "latex," "emulsion," "dispersion," and "suspension" are generally analogous and indicate a system in which small particles of a substance, such as rubber particles, are mixed with a fluid (such as water and/or alcohols and/or other organic fluids) but are at least partially undissolved and kept dispersed by agitation (mechanical suspension) and/or by the molecular forces in a surrounding medium (colloidal suspension). Emulsions contemplated herein may further comprise typical and suitable components for rubber or elastomeric formulations and compounds, such as accelerators, such as guanidines, thiazoles, thiurams, sulfenamides, thioureas, dithiocarbamates, and xanthanates, surfactants, such as sodium dodecyl sulfates and polyvinyl alcohols, activators, such as zinc oxides, cross-linking agents and curatives, such as elemental sulfur and/or polysulphidic donors, anti-oxidants, anti-ozonants, rheology-modifiers, such as various clays and aluminosilicates, pH adjusters, such as hydroxides, such as potassium hydroxide, pigments, processing agents, and/or fillers as are known to those in the art. Suitable accelerators include, but are not limited to, 2-Mercaptobenzothiazole, Dibenzothiazole disulfide, 2-Mercaptobenzothiazole Zinc salt, N-Cyclohexyl-2-benzothiazole sulfenamide, N-Oxydienthylene-2-benzothiazole sulfenamide, N-tert-butyl-2-benzothiazyl sulfenamide, Diphenyl guanidine, Di-o-tolylguanidine, Tetramethyl thiuram disulfide, Tetraethyl thiuram disulfide, Tetramethyl thiuram monosulfide, Isobutyl thiuram disulfide, Tetrabenzylthiuram disulfide, Dipentamethylene thiuramtetrasulfide, Zinc dimethyl dithiocarbamate, Zinc diethyl dithiocarbamate, Zinc dibutyl dithiocarbamate, Zinc N-ethyl-dithiocarbamate, Zinc dibenzyl dithiocarbamate, Copper dimethyl dithiocarbamate, Ethylene thiourea, N,N'-Diethylthiourea, and/or N—N'-Diphenylthiourea.

The term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" includes all possible geometrical configurations of the molecule. These configurations include, but are not limited to isotactic, syndiotactic and random symmetries.

The term "thermoplastic" generally includes polymer materials that become reversibly pliable, moldable, and/or heatable above a specific temperature and solidify upon cooling. The term "thermoset" generally includes polymer materials that strengthen following heating and solidification, but cannot be successfully remolded or otherwise processed after an initial heat-forming. The term "thermoplastic elastomer" (TPE) connotes a class of copolymers comprising both thermoplastic and elastomeric/thermoset material properties and generally have crosslinking between adjacent polymeric molecular chains. The term "rubber" generally indicates elastomers produced from natural rubber latexes or synthetic elastomers.

Exemplary thermoplastics include, without limitation, polychloroprenes, butyl rubbers, natural rubber, synthetic polyisoprenes, poly(vinyl) chlorides, polyesters, polyamides, polyfluorocarbons, polyolefins, polybutadienes, polyurethanes, polystyrenes, poly(vinyl) alcohols, and copolymers of the foregoing, and elastomeric polymers such as elastic polyolefins, copolyether esters, polyamide polyether block copolymers, block copolymers having the general formula A-B-A' or A-B, such as nitrile-butadiene rubber (NBR), carboxylated nitrile-butadiene rubber, styrene-poly (ethylene-propylene)-styrene, styrene-poly(ethylene-butylene)-styrene, (polystyrene/poly(ethylene-butylene)/polystyrene, poly(styrene/ethylene-butylene/styrene), co-poly (styrene/ethylene-butylene), poly(isobutene-isoprene), A-B-A-B tetrablock co-polymers and the like and blends of any of the foregoing.

In embodiments, NBR may refer to nitrile rubber or a synthetic rubber copolymer of acrylonitrile (ACN) and butadiene. In embodiments, NRL may refer to natural latex rubber.

Although some embodiments have been discussed above, other implementations and applications are also within the scope of the following claims. The disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the following claims. Also, as used in this specification and the appended claims, the singular forms "a," "an," and "the" include plural referents unless the context clearly dictates otherwise.

"Optional" or "optionally" means that the subsequently described event or feature may or may not occur or be necessary for any embodiment, or that the subsequently identified material may or may not be present, and that the description includes instances where the event or feature occurs or where the material is present, and instances where the event or feature does not occur or the material is not present.

As used herein, the terms "comprises," "comprising," "includes," "including," "has," "having," or any other tense thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

As used herein, throughout the specification and claims, approximating language may be applied to modify any quantitative representation that could permissibly vary without resulting in a change in the basic function to which it is related. Accordingly, a value modified by a term or terms, such as "about" or "approximately," is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about" or "approximately."

All ranges recited herein include ranges there between, and can be inclusive or exclusive of the endpoints. Optional included ranges are from integer values there between (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

The term "flexing" or "flex" refers to finger movements, such as bending fingers, making a fist, gripping, grasping, clenching or otherwise folding the fingers.

Publications and references, including but not limited to granted patents and published patent applications, cited in this specification are herein incorporated by reference in their entirety in the entire portion cited as if each individual publication or reference were specifically and individually indicated to be incorporated by reference herein as being fully set forth.

What is claimed is:

1. A thin organic solvent resistant glove, comprising:
   a first polymeric layer in a shape of a glove comprising at least one of a blend of a polyisobutylene material and a nitrile-butadiene material, or a nitrile-butadiene material;
   a second polymeric layer in a shape of a glove comprising at least one of a polyisobutylene material or a blend of a polyisobutylene material and a nitrile-butadiene material, disposed on the first polymeric layer; and
   a third polymeric layer in a shape of a glove comprising a nitrile-butadiene material or an acrylic polymer material, disposed on the second polymeric layer.

2. The thin organic solvent resistant glove of claim 1, wherein the second polymeric layer is a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr).

3. The thin organic solvent resistant glove of claim 1, wherein the first polymeric layer is a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr).

4. The thin organic solvent resistant glove of claim 1, comprising a first polymeric layer having a thickness of 0.20 mm.

5. The thin organic solvent resistant glove of claim 1, wherein a total thickness of the thin organic solvent resistant glove is approximately 0.275 mm.

6. The thin organic solvent resistant glove of claim 1, wherein the first polymeric layer or the third polymeric layer is disposed as an external layer.

7. The thin organic solvent resistant glove of claim 1, wherein the thin organic solvent resistant glove is cured.

8. The thin organic solvent resistant glove of claim 7, wherein the blend of a polyisobutylene material and a nitrile-butadiene material of the first polymeric layer comprises about 80 to 95 parts per hundred rubber (phr) nitrile-butadiene material.

9. The thin organic solvent resistant glove of claim 1, wherein the blend of a polyisobutylene material and a nitrile-butadiene material of the first polymeric layer comprises about 5 to 20 parts per hundred rubber (phr) polyisobutylene material.

10. An organic solvent resistant glove, comprising:
    a first cured polymeric layer in a shape of a glove comprising a blend of a polyisobutylene material and a nitrile-butadiene material;
    a second cured polymeric layer in a shape of a glove comprising at least one of a polyisobutylene material or a blend of a polyisobutylene material and a nitrile-butadiene material, disposed on the first cured polymeric layer; and
    a third cured polymeric layer in a shape of a glove comprising a nitrile-butadiene material or an acrylic polymer material, disposed on the second cured polymeric layer.

11. The organic solvent resistant glove of claim 10, wherein the first cured polymeric layer is a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr) disposed as an external layer.

12. The organic solvent resistant glove of claim 10, wherein the second cured polymeric layer comprises a blend of a polyisobutylene material and a nitrile-butadiene material, disposed on the first cured polymeric layer, and wherein the polyisobutylene is present in an amount of 75 to 95 parts per hundred rubber (phr), and wherein nitrile-butadiene is present in an amount of 5 to 25 parts per hundred rubber (phr).

13. The organic solvent resistant glove of claim 10, wherein the third cured polymeric layer comprises a nitrile-butadiene material disposed on the second cured polymeric layer.

14. A thin organic solvent resistant glove, comprising:
an inner polymeric layer in a shape of a glove comprising a nitrile-butadiene material or an acrylic polymer material;
a middle polymeric layer in a shape of a glove comprising at least one of a polyisobutylene material, a blend of a polyisobutylene material and a nitrile-butadiene material, or a blend of polyisobutylene material and polychloroprene material disposed on the inner polymeric layer; and
an external polymeric layer in a shape of a glove comprising at least one of a blend of a polyisobutylene material and a nitrile-butadiene material, a nitrile-butadiene material, a polychloroprene material, a blend of polychloroprene material and nitrile butadiene material, or a blend of nitrile butadiene material, polychloroprene material and polyisobutylene material disposed on the middle polymeric layer.

15. The thin organic solvent resistant glove of claim 14, wherein the middle polymeric layer in a shape of a glove is disposed on the inner polymeric layer and comprises a blend of polyisobutylene material and a nitrile-butadiene material, wherein the polyisobutylene is present in an amount of 75 to 95 parts per hundred rubber (phr), and wherein nitrile-butadiene is present in an amount of 5 to 25 parts per hundred rubber (phr).

* * * * *